Oct. 17, 1950 D. W. KEYSTON 2,526,140
HARNESS AND RING THEREFOR
Filed Aug. 25, 1947
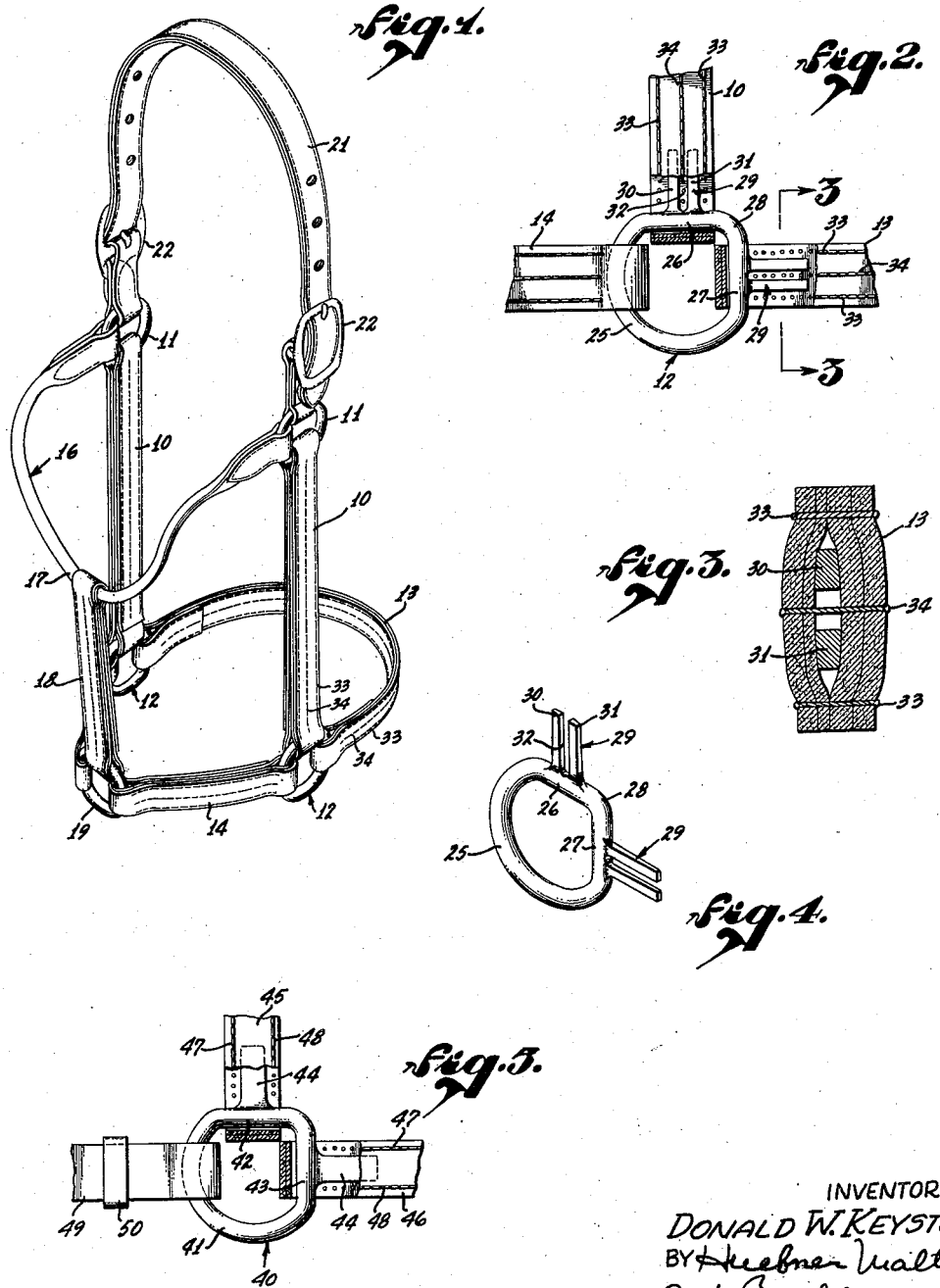
INVENTOR:
DONALD W. KEYSTON
BY
ATTORNEYS.

Patented Oct. 17, 1950

2,526,140

UNITED STATES PATENT OFFICE 2,526,140

HARNESS AND RING THEREFOR

Donald W. Keyston, Pasadena, Calif., assignor to Lichtenberger-Ferguson Co., Los Angeles, Calif., a corporation of California Application August 25, 1947, Serial No. 770,389

3 Claims. (Cl. 54—24)

The invention relates to harness for horses and similar animals and has special reference to a device by means of which straps comprising the harness are joined together so that the straps retain a proper relationship one with respect to the other.

Devices in the harness art have been subject to somewhat standardized design for a great many years, the elements of which were reasonably well established at the time when use of horses for ordinary travel was at its height. Although the use of horses and horse-drawn vehicles has largely given way to the combustion engine, nevertheless in certain fields there still remains a substantial demand for horses and a suitable harness to use with them. One of these fields, in particular, is the use of horses for riding and recreation.

The harness sought for saddlery purposes on many occasions is of particularly high quality and good performance characteristics. Although workmanship in saddlery harness has been improved upon, relatively little improvement has been made in joining hardware which forms a part of the harness.

It is, therefore, among the objects of the invention to provide a new and improved harness item wherein the different straps forming the harness are joined together by hardware of such character and design that the straps of the harness may be maintained in their initial relationship to each other and not permitted to slide or flex out of place when the harness is being used or later when the straps forming the harness lose a substantial portion of their initial stiffness as a result of continued oiling and wear.

Another object of the invention is to provide a harness item in which various strap elements of the harness item are maintained in such relationship to each other that the harness can be much more easily applied to the animal than heretofore.

Still another object of the invention is to provide a new and improved harness item which is exceptionally safe when being fitted upon an animal, which is capable of much longer wear than similar items heretofore provided, and which maintains a trim and correct appearance at all times.

Still further among the objects of the invention is to provide a new and improved harness ring around which strap portions of the harness are adapted to be stretched so constructed that the strap portions can be stretched around elements of the ring in such a manner that the strap portion in each case retains a substantially fixed relationship with respect to the ring.

Also among the objects of the invention is to provide a new and improved harness ring so constructed that stitching for fastening strap portions of the harness can be run close to elements of the ring in order to effect a neat, tight job of stitching while at the same time adding substantially to the rigidity of the joint between the strap portions and the ring.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a side perspective view of a harness item incorporating the invention.

Figure 2 is an enlarged fragmentary view of a portion of the harness item of Figure 1 partially broken away.

Figure 3 is a cross-sectional view taken on the line 3—3 of Figure 2.

Figure 4 is a side perspective view of a ring used in Figures 1, 2 and 3.

Figure 5 is a fragmentary view similar to Figure 2 but showing a modified type of ring.

Although the invention herein described may be applicable to any one of a number of different harness items adapted for use on horses, mules and other quadrupeds, by way of example the invention is herein described in connection with a halter designed to fit over a horse's head by means of which the horse may be led about or tethered.

In an embodiment chosen to illustrate the invention there is shown a harness item identified as a halter consisting of stitched strap portions or elements ordinarily made of leather joined together by appropriate rings. As illustrated, there is shown a runner 10 on each side attached at the upper end to a ring 11 and at the lower end to a ring 12. By way of example, the upper ring 11 is circular, and the lower ring has a particular form best illustrated in Figures 2 and 4. A nose piece 13 is attached at one end to the ring 12 on one side of the halter and at the other end to the ring 12 on the opposite side.

The nose piece, as its name implies, ordinarily lies over the nose of the horse when the halter is applied to the horse's head, and the runners extend along the sides of the head approximately spanning the distance between a point below the horse's ears and the corners of the mouth.

Also attached to the rings 12 is a strap, herein designated as a chin strap 14, one end of the chin strap being attached to one of the rings 12 and the other end to the other ring 12.

Attached to the rings 11 is a throat latch 16 which extends from one to another of the rings 11 and may, as illustrated in the chosen embodiment, be so stitched as to assume a downwardly curved direction at the center 17 of the loop at which point there is secured a short, stiff strap 18, the lower end of which is provided with a ring 19 joined to the chin strap 14. Secured, also, to the rings 11 is a crown piece 21 which may be provided with buckles 22 to render it adjustable.

Of particular moment is the construction of the rings 12 and the manner in which the rings 12 are joined to the runners 10 and the nose piece 13. Attention is directed to details illustrated in Figure 2. As there shown, the ring 12 comprises one substantially 180° arc 25 which is substantially circular throughout its length. The remaining portion of the perimeter of the ring consists of two straight sections 26 and 27 which join each other at the point 28 wherein they make a square corner or substantially right angle one with respect to the other. Ordinarily, the length of the straight section in each case will be slightly in excess of the width of the strap 10 or 13 as the case may be. The loop of the strap about the ring will be relatively snug as is ordinarily the practice in constructing this particular portion of a halter.

On the straight section 26 there is provided a prong 29, here shown as consisting of individual tines 30 and 31, separated by a slot 32. The straight section 27 is similarly constructed.

When the runner 10, for example, is stitched to the straight section 26 of the ring 12, a triple stitching is provided, the outside stitches 33 being carried along the margin of the runner up to a point very close to the ring and a central stitch 34 being carried between the tines 30 and 31 within the slot 32 likewise to a point closely adjacent the base of the slot which is substantially at the outside edge of the straight section 26 of the ring. The nose piece is similarly stitched.

Constructed in this manner the runner 10 and the nose piece 13, where they are attached to the ring, will maintain substantially a right angular relationship one with respect to the other. The rigidity of the right angular relationship is made possible by the combined effect of positioning the prong 29 within the respective strap by means of stitching and also by reason of the provision of a straight section for the ring immediately adjacent the prong.

Inasmuch as some flexibility is desirable at harness joints, the chin strap 14 is attached to the arc 25 of the ring by conventional means, namely, by being merely looped around the ring in a loop, tight or loose as may be desired, and there stitched in place. Attached in this manner the chin strap 14 is permitted a certain freedom of movement throughout the length of the circular portion of the ring 12; whereas, the remaining strap portions comprising the runner 10 and nose piece 13 remain fixed with relation to each other but can swing as a unit with respect to the chin strap 14.

The same construction, so far as the attachment of the runner, the nose piece and the chin strap are concerned, applies to the ring on both sides of the halter.

In a modified form of the invention, illustrated in Figure 5, a ring is provided which is more readily adapted for use with halters of lighter weight. In this embodiment a ring 40 may be used in the form heretofore described with a substantially 180° arcuate portion 41 and with straight sections 42 and 43. In the last instance each of the straight sections is provided with a solid prong 44.

Use of the ring with solid prongs is desired when a lighter weight harness item is in prospect. This may comprise a strap 45 joined to the ring 40 at the straight section 42 and a strap 46 joined to the ring at the straight section 43. In this instance, however, a double line only of stitching is used consisting of stitches 47 and 48, these stitches being made along a line suitably spaced from the outside edges of the strap and carried reasonably snug against the sides of the prongs. As usual, the stitches are carried to a point reasonably close to the adjacent portion of the ring so that the connection between the strap 45, or 46 as the case may be, to the ring is stiff and tight. The relationship between the straps in the last described modification is maintained in the same manner as was described in the form first identified. In this last instance still a third strap 49 may encircle the arcuate portion 41 of the ring and be retained by a loop 50.

In a harness item of the type described the ring 12, which may for convenience be designated as a squared ring, can be used whenever it is desired to have two strap elements of the harness joined in such a manner that their relationship one with respect to the other is maintained. Obviously, a ring of this type may be provided with as many prongs as may be desired in accordance with the number of strap elements which must be maintained in some fixed relationship.

Harness leather is ordinarily quite heavy in gauge and applied in layers of sufficient thickness so that when the various layers of leather are stitched together the resultant stitched strap will have considerable stiffness. Consequently, when the relatively stiff leather element is joined to a ring of the type described, a harness item utilizing these features will maintain its shape and trimness of appearance throughout the life of the article.

In halters, particularly where the nose piece and runners are joined in the manner described, the halter may be slipped over the horse's head without likelihood of the nose piece flexing or bending downward limply and thus inadvertently catching in the horse's mouth. Also, if the halter should chance to be slightly large for a particular horse, which on some occasions might be unavoidable, the nose piece will remain above the horse's nose and will not slip down.

By reason of the fact that the strap elements are maintained in their initial positions with a proper degree of stiffness, the leather comprising those elements will not be so easily mistreated, and the harness item will wear considerably longer.

Moreover, harness items constructed with squared rings of the type herein described can be made with the same facility and by use of the same equipment now commercially employed for making similar harness items.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what I claim as new and desire to secure by Letters Patent is:

1. A harness device comprising a ring having one-half the perimeter comprising a curved section and the other half comprising two straight sections at right angles to each other, each straight section having an outwardly extending prong, said prongs having each a longitudinal slot, multiple layer strap elements of relatively stiff consistency looped around the straight sections and strap elements around the curved section, stitching along the sides and center of those strap elements looped around said straight sections extending along the sides and within the slots of said prongs whereby said stitched sections are maintained in substantially the same angular relationship to each other as said prongs.

2. A halter for horse-like animals comprising strap elements and joining rings therefor, said strap elements comprising a crown piece having rings at the ends, runners joined to the rings and a throat latch joined at its ends to the rings, rings at the ends of the runners remote from the crown piece, a chin strap assembly connected at the ends thereof to said last identified rings and intermediate the ends to the throat latch, and a nose piece connected at its opposite ends to said last identified rings, said last rings comprising each a straight side adjoining the runner and another straight side at right angles to the first and adjoining the nose piece, prongs having each a medial slot extending outwardly one from each straight side and encompassed by layers of leather forming respectively the nose piece and the runner, and stitching at the sides and center of the nose piece and of the runner extending into the slots and along the sides of the prongs whereby the nose piece is maintained in a position substantially at right angles to the runners.

3. A harness device comprising a ring having part of the perimeter comprising a curved section and part comprising a straight section, the straight section having an outwardly extending prong, said prong having a longitudinal slot and parallel outside edges substantially the same length as the longitudinal slot, a strap element looped around the straight section and stitching along the sides of the strap element and within the longitudinal slot, and a second strap element looped around the curved section and stitching securing the last identified strap element to the curved section with sufficient looseness whereby the last-identified strap element is free to slip from end to end of the curved section.

DONALD W. KEYSTON.

REFERENCES CITED

The following references are of record in the file of this patent:

UNITED STATES PATENTS

| Number | Name | Date |
|---|---|---|
| 896,164 | Schreiter | Aug. 18, 1908 |
| 1,585,261 | Nichols | May 18, 1926 |

FOREIGN PATENTS

| Number | Country | Date |
|---|---|---|
| 14,729 | Great Britain | Sept. 20, 1892 |